United States Patent [19]

Kamiyama et al.

[11] 3,775,623

[45] Nov. 27, 1973

[54] SEMICONDUCTOR DEVICE FOR SCANNING DIGITAL SIGNALS

[75] Inventors: Takamitsu Kamiyama, Kokubunji; Mikio Ashikawa, Koganei, both of Japan

[73] Assignee: Hitachi, Ltd., Tokyo, Japan

[22] Filed: Dec. 7, 1971

[21] Appl. No.: 205,629

[30] Foreign Application Priority Data

Dec. 7, 1970 Japan ............................ 45/107565

[52] U.S. Cl. ............ 307/221 C, 317/235, 307/251, 307/304

[51] Int. Cl. ........................................... G11c 11/40

[58] Field of Search ............... 307/205, 221 C, 251, 307/279, 304; 317/235

[56] References Cited

UNITED STATES PATENTS

| | | | |
|---|---|---|---|
| 3,378,688 | 4/1968 | Kabell | 317/235 |
| 3,378,783 | 4/1968 | Gibson | 317/235 |
| 3,657,573 | 4/1972 | Maute | 307/304 |
| 3,676,727 | 7/1972 | Dalton | 313/66 |

*Primary Examiner*—John W. Huckert
*Assistant Examiner*—R. E. Hart
*Attorney*—Craig, Antonelli & Hill

[57] ABSTRACT

A semiconductor device for scanning digital signals includes first and second rows each consisting of a plurality of MOSFETs having same threshold voltage $V_{th}$, electrical connecting means for connecting the drain electrodes of the MOSFETs in the first row to the source electrodes of MOSFETs in the second row, respectively, a first resistive substance layer having a linear shape, for connecting all the gate electrodes of the first row in series, a second resistive substance layer having a linear shape, for connecting all gate electrodes of the MOSFETs in the second rows, and two saw-tooth wave generators, each connecting to one terminal of each said resistive substance layer, in order to apply a voltage varying in value with respect to time to each gate electrode of the MOSFETs.

20 Claims, 9 Drawing Figures

INVENTORS

TAKAMITSU KAMIYAMA,

MIKIO ASHIKAWA

BY

Craig, Antonelli & Hill

ATTORNEYS

PATENTED NOV 27 1973

3,775,623

INVENTORS

TAKAMITSU KAMIYAMA,

MIKIO ASHIKAWA

BY Craig, Antonelli & Hill
ATTORNEYS

INVENTORS

TAKAMITSU KAMIYAMA

MIKIO ASHIKAWA

BY Craig, Antonelli & Hill

ATTORNEYS

SEMICONDUCTOR DEVICE FOR SCANNING DIGITAL SIGNALS

FIELD OF THE INVENTION

This invention relates to a novel semiconductor device capable of scanning one-dimensional or two-dimensional digital signals.

DESCRIPTION OF THE PRIOR ART

The circuit device for one-dimensional or two-dimensional digital scanning it utilized in an input-output device for a computer, a facsimile device, a television camera, a display device, a character and numerical indicator, etc. For this purpose, a shift register of an MOS type or bipolar type has been employed.

In the prior art, the shift register needs four or more transistor elements per bit. Therefore, with an increase in the number of bits, a larger number of elements must be used for the shift register. To form the transistor elements into an integrated circuit, a highly specialized technique is required and the yield rate in the production of a shift register is decreased. Furthermore, in the digital scanning shift register, the failure of one bit disables the shift register from shifting the next stage bit, to stop the register function.

SUMMARY OF THE INVENTION

In view of the foregoing, a general object of this invention is to provide a semiconductor device for scanning digital signals, which has a novel structure with a minimized number of elements and is manufacturable by simplified production process.

The subject matter of the present invention relates to a semiconductor device for scanning digital signals including an array of voltage controlled type circuit elements, such as field effect transistors, with currents flowing between the first and the second electrodes of the elements being controlled by a voltage applied to the controlling electrodes provided on predetermined positions of the element, connecting means for connecting each controlling electrode of the voltage controlled type circuit elements in series with each other through resistors, and variable voltage applying means connected to the connecting means for applying different voltages to each controlling electrode, whereby the voltage controlled type circuit elements in the array shift sequentially from the ON state to the OFF state or from the OFF state to the ON state, with variation of the voltage applied to the connecting means.

Explanation is given to the principle of this invention with reference to the field effect transistor of the MOS type ( hereinafter referred to as a MOSFET ) by way of example. The reason why the explanation is given with respect to a MOSFET is that a MOSFET is easy to manufacture in the form of an integrated circuit and a plurality of elements can be provided in a semiconductor wafer at one time.

It is important, according to the principle of this invention, that the circuit elements used in the semiconductor device of the present invention should have a controlling electrode with a high input impedance such as a MOSFET. In case the input impedance of the controlling electrode is small, such as a current controlled type circuit elements, which is especially considerably small as compared with the resistive layer, it is impossible to establish an ideal potential distribution discussed hereafter, on each controlling electrode and, as a result, a complicated potential distribution, which is difficult to control, is established.

Circuit elements of the voltage controlled type usually used are not only MOSFETs but also field effect transistors of the junction type and thin film type. There is no special limitation to the resistive substance connecting the controlling electrodes in series with each other, but referring to the case where such a resistive substance is constructed in an integrated circuit, it is preferred that the substance be easy to deposite and easy to finely machine and, furthermore, should have a close thermal expansion coefficient to the base layer, such as an $SiO_2$ film and a large resistivity as well as a small rate of temperature variation. In the preferred embodiment of the present invention, resistive materials such as tantalum, molybdenum, tungsten, chromium, titanium or $SnO_2$ were used as the resistive substance, and good results can be obtained for all these materials.

Almost all of the resistive materials referred to above are metals having high melting temperatures and the films thereof were formed by the sputtering method or the electron beam vapor deposition method. Other methods can also be used.

In the present invention, field effect transistors having characteristics of the enhancement type are preferably employed in the design of the circuit; however, MOS type-transistors having characteristics of the depletion type can also be employed by applying a D. C. bias voltage superimposed on the saw-tooth voltage applied to the resistive substance layer.

In order to understand the present invention more fully, the embodiments thereof will be described. In these embodiments, reference is made to MOSFETs for the convenience of explanation, but any other circuit elements of the voltage control type can be utilized.

BRIEF DESCRIPTION OF THE DRAWING:

FIG. 1 is a top view of a wafer in which MOSFETs $1_1$, $1_2$, . . . , $1_n$, each having substantially the same threshold voltage $V_{th}$, are formed in a row on the semiconductor substrate and gate electrodes of the respective MOSFETs are connected in series with each other through resistive substance layers. In the drawing, $2_1$, $2_2$, . . . , $2_n$ show source electrodes of the MOSFETs, $3_1$, $3_2$, . . . , $3_n$ show drain electrodes of the MOSFETs and $4_1$, $4_2$, . . . , $4_n$ show gate electrodes of the MOSFETs 5 indicates a resistive substance layer connecting the gate electrodes of the MOSFET in series with each other, and has two terminals $6_1$ and $6_2$ at both ends of which a variable voltage is applied.

FIG. 2 shows an enlarged longitudinal section taken along the line A–A' of FIG.1. In the drawing, 10 indicates a semiconductor substrate on the surface of which a source region 11 and a drain region 12 of a conductivity type opposite to the semiconductor substrate are formed and metallic layers 14 and 15 are provided on these two regions 11 and 12 so as to form a source electrode 14 and a drain electrode 15 respectively through an opening in the insulating film 13. Conductive metallic layers 16 and 17 for leading to the source and the drain electrodes are provided on the insulating film13.

Further, a metallic layer19 consisting of a resistive material is provided on a thin insulating layer which exists in the gate region between the source region and the drain region and, thus, is referred to as the gate insulator of the MOSFET. Referring to corresponding portions of FIG. 1 to FIG. 2, the source electrode $2_2$, the drain electrode $3_2$ and the resistive substance layer 5 in FIG. 1 correspond to the metallic layer 14 for the source electrode, the metallic layer 15 for the drain electrode and the metallic layer 19 for the gate electrode in FIG. 2, respectively.

Figure 1:
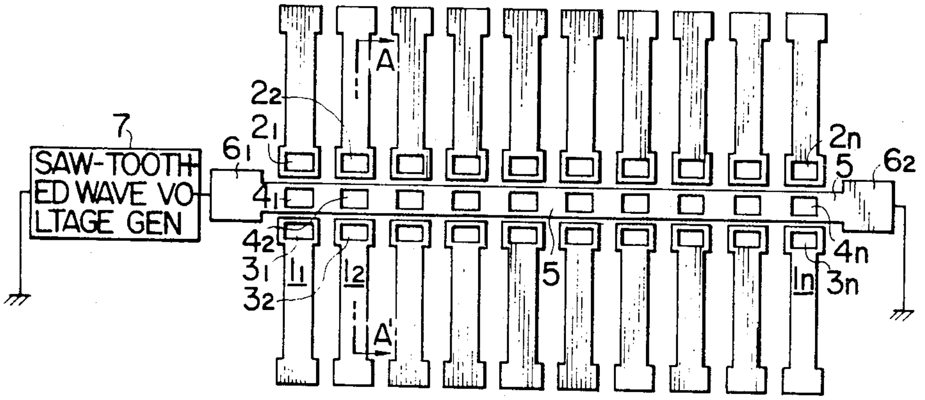
FIG. 1 is a top view showing a semiconductor device according to the present invention.
Figures 3, 4:
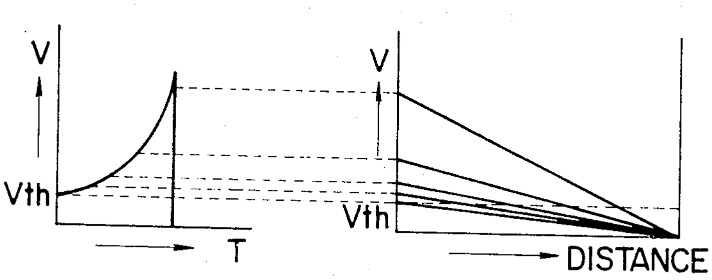
FIG. 3 shows an example of a wave form of a saw-tooth voltage having a non-linear characteristic with respect to time.
FIG. 4 shows the potential distribution of the saw-tooth voltage of FIG. 3.

Considering an n-channel enhancement type element as a MOSFET, the source-drain path is in the OFF state at a gate voltage of 0 (V). It is now presumed that the terminal $6_2$ is grounded at 0 (V), and another terminal $6_1$ is connected to a saw-tooth voltage generator 7, as shown in FIG.1, in order to supply a saw-tooth voltage, as shown in FIG. 3, between the terminals $6_1$ and $6_2$. Upon application of the saw-tooth voltage between the terminals $6_1$ and $6_2$, a potential distribution ( FIG. 4 ) is established in the direction of $6_1$ –$6_2$ on the resistive layer 5 and the position of the potential $V_{th}$ ( threshold voltage ) will move from the terminal $6_1$ side to the terminal $6_2$ side with the passage of time. Accordingly, the array of MOSFETs of FIG. 1 are shifted into the ON state sequentially from the side of the terminal $6_1$ and eventually all of the MOSFET are switched ON.

Figure 6A:
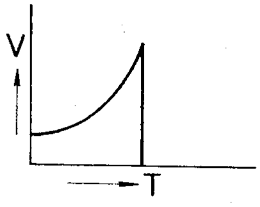
FIG. 6 (a) and 6(b) show wave forms of saw-tooth voltage, respectively, generated by the saw-tooth generator of FIG. 5.
Figure 6B:
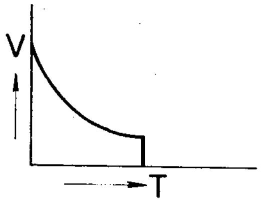

Meanwhile, with the terminal $6_2$ being at 0 (V) and the terminal $6_1$ being supplied with the saw-tooth voltage, as shown in FIG. 6 (b), the MOSFETs are all in the ON state at time $t = 0$ and the position of the potential $V_{th}$ moves from the terminal $6_1$ side to the terminal $6_2$ side with the passage of time with the result that the respective MOSFETs of the array will be turned OFF sequentially from the side of the terminal $6_1$ to that of the terminal $6_2$ and, finally, all of the MOSFETs will be OFF.

The two operations above referred to are fundamental for the present invention and more complicated operations can be realized by combination of such two fundamental operations.

DESCRIPTION OF THE PREFERRED EMBODIMENT

Example 1

Figure 2:
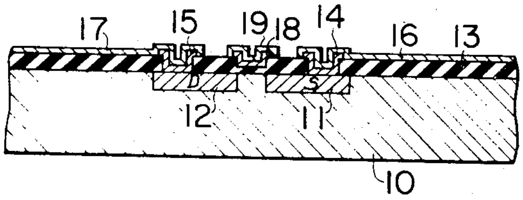
FIG. 2 is a longitudinal sectional view taken along the line A—A' in FIG. 1.

In the structure as shown in FIGS. 1 and 2, numeral 10 denotes a N-type silicon substrate having resistivity of 2 Ω cm and source and drain regions 11 and 12 of P-type respectively. The source and drain regions are formed with an interval ( channel length ) of 10 μm apart from each other by diffusion of P-type impurities on the surface of the substrate. A thin $SiO_2$ film having a thickness of 1,000A. is provided on the surface of the semiconductor substrate between the source and the drain regions while a thick $SiO_2$ film having a thickness of 8,000 A. is provided on the other surface of the substrate. The source, drain and gate electrodes 14, 15 and 18 are made of aluminum layers of a thickness of 7,000 A by any well known method.

The threshold voltage $V_{th}$ of such a MOSFET is typically 1 (V). Several dozen MOSFET elements of FIG. 2 are arranged in a row at equal intervals of 100μm on the silicon substrate as shown in FIG. 1 and resistive substance layer 19 such as a tantallic film layer having a thickness of 0.1 μm is provided to connect the gate electrodes in series with each other. Next conductive layers ( Al layers ) 16 and 17 and terminals ( Al layers ) $6_1$ and $6_2$ of resistive substance layers are attached to the source, the drain electrodes and two terminals of the resistive layer, respectively.

When a voltage is supplied to terminal $6_1$ of the semiconductor device thus assembled and increases from the value $V_{th}$ to that of five times the same for 1/1,000 second along a quadratic curve with the time passing as shown in FIG. 3, the MOSFETs in the ON state will increase from the side of the terminal $6_1$ at a constant rate with the passage of time. After all of the MOSFET are turned ON in 1/1,000 second, the voltage $V_{th}$ is again applied to the terminal $6_1$, and then the MOSFETs, all of which have been in the ON state, are turned OFF again. Upon a repeat application of the voltage having a waveform as shown in FIG. 3, the state above referred to could be reproduced.

In the present embodiment, if the voltage of a saw-tooth waveform is applied to the terminal $6_1$ , the value of which increases with a non-linear function with the passage of time, the MOSFETs positioned near the side of the terminal $6_1$ are turned ON within a shorter period of time, while the MOSFET elements near the terminal $6_2$ are delayed in turning ON. It is, therefore, necessary to apply the voltage of the waveform shown in FIG. 3, in order to turn the MOSFETs ON at a constant rate. Another method for turning the MOSFETs ON at a constant rate is to arrange the MOSFETs in a row each MOSFET being respectively closer to another from the terminal $6_1$ to the terminal $6_2$. This results in that each element can turn ON at a constant rate even with application of the saw-toothed wave voltage changing non-linearly with respect to time to the terminal $6_1$.

Further, another method for turning the MOSFETs ON at a constant rate is to vary the resistance value of each resistor inserted between the gate electrodes. For achievement of such construction, it is desirable to vary the width or thickness of each resistive substrate layer which are formed by vacuum evaporation of the resistive substance between the gate electrodes of MOSFETs.

Example 2

Explanation is given in this example to a semiconductor device suitable for a one-dimensional scanning of an ON region. For two-dimensional scanning, two such semiconductor devices may be used, one being for the X-direction and the other for the Y-direction.

Figure 5:
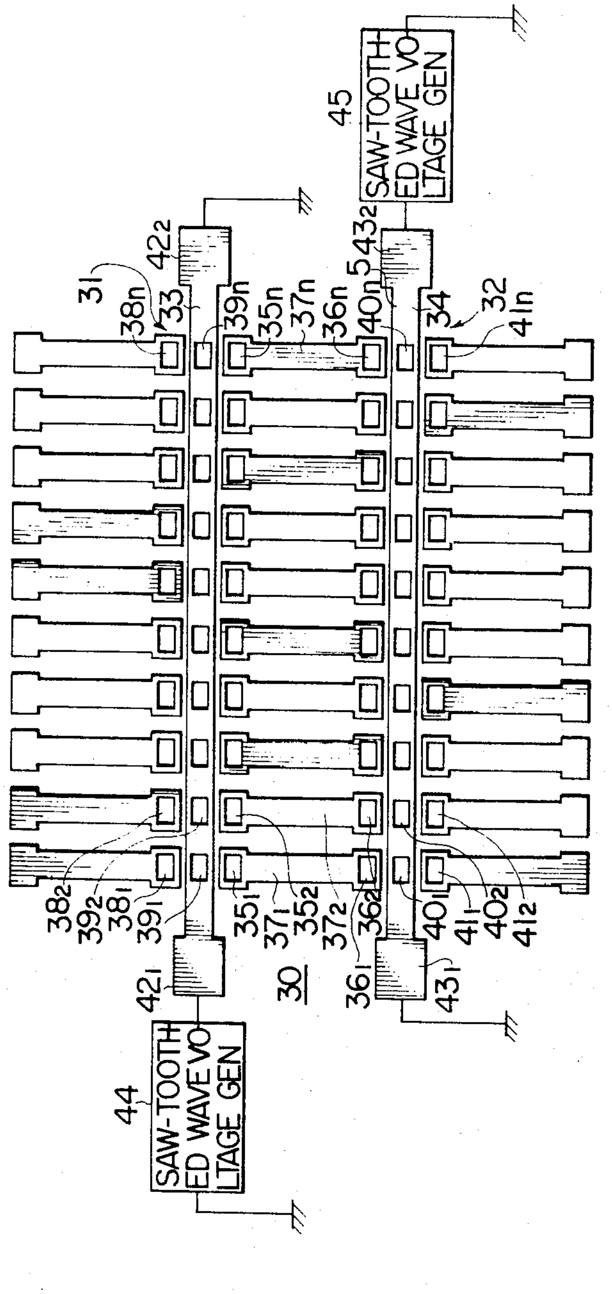
FIG. 5 is another embodiment of the present invention and is a top view of a circuit element suitable for one dimensional scanning of digital signals.

Referring to FIG. 5, a first row 31 of MOSFETs and a second row 32 of MOSFETs are arranged on a major surface of a semiconductor substrate 30. The gate electrodes of each row are connected to each other by resistive substance layers 33 and 34, and the drain electrodes $35_1$, $35_2$, . . . $35_n$ of the first row of MOSFETs are connected to the source electrodes $36_1$, $36_2$, . . . $36_n$ of the second row of MOSFETs through conductive layers $37_1$, $37_2$, $37_3$, . . . $37_n$. Thus, each element of the first and the second rows of MOSFETs are connected in series with each other through the conductive layers $37_1$, $37_2$, . . . $37_n$ as shown in FIG. 5. Reference numerals $38_1$, $38_2$, . . . , $38_n$ designate source electrodes of the first row of MOSFET elements and $39_1$, $39_2$, . . . $39_n$ show gate electrodes of the same row.

Reference numerals $40_1$, $40_2$, . . . $40_n$ designate gate electrodes of the second row of MOSFET elements and $41_1$, $41_2$, . . . $41_n$ show drain electrodes of the same row. Reference numerals $42_1$ and $42_2$ designate terminals of the resistive substance layer 33, and $43_1$ and $43_2$ are also terminals of the resistive substance layers 34, 44 and 45 are saw-tooth wave generators connected to the terminals $38_1$ and $39_2$, respectively.

When a voltage is applied from each saw-tooth wave generator, as shown in FIG. 6 (a) and 6 (b) to terminals $42_1$ and $43_2$ in such a manner that the ON region of the first row of MOSFETs and the ON region of the second row of MOSFETs partially overlap with each other, the MOSFET elements of an overlapping region are turned ON and this ON portion moves with the passage of time. If the overlapping portion is limited to one of the first MOSFET rows and one of the second MOSFET rows, the ON state will move, one by one down the row of MOSFETs.

Figure 7:
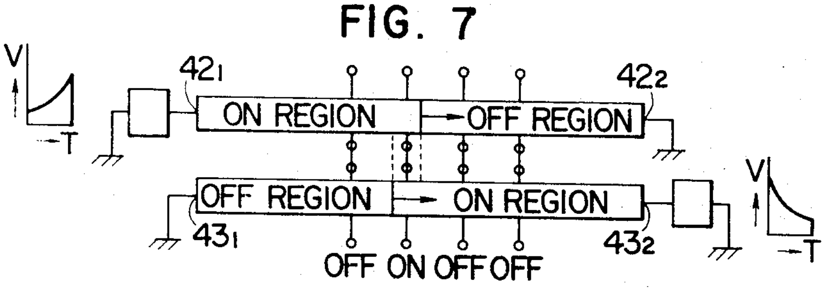
FIG. 7 is an explanatory view of principle of one dimensional scanning of digital signals of the circuit device of FIG. 5.

Referring to FIG. 7, the MOSFETs will turn ON sequentially from the terminal $42_1$ to the terminal $42_2$ for the range between these two terminals, while MOSFETs will turn OFF sequentially for the range between the terminals $43_1$ and $43_2$. If the ON region between the terminals $42_1$ and $42_2$ and the ON region between the terminals $43_1$ and $43_2$ overlap with each other, only for a pair of MOSFETs ( area bordered by two dotted lines ), only such a pair of MOSFETs contained in the overlapping ON region turn ON and then move sequentially from left to right in the drawing, with the result that one-dimensional scanning will be achieved.

Figure 8:
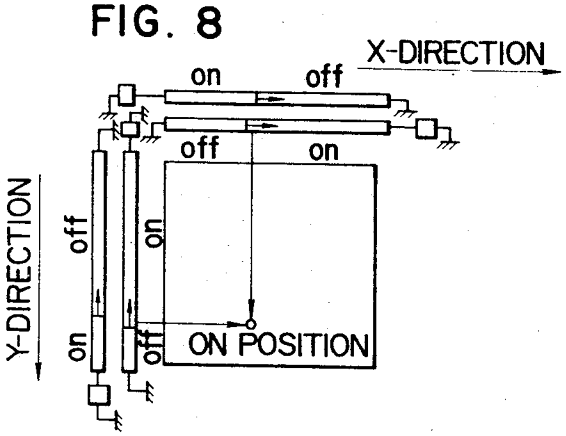
FIG. 8 is also an explanatory view of principle of the two dimensional scanning, utilizing two circuit devices of FIG. 5.

Two-dimensional scanning can be realized by arrangement of the circuit device of the present invention in the directions of X and Y directions as shown in FIG. 8 by way of example.

The semiconductor device of the present invention can be made of high density by IC techniques and the use of MOSFETs provides a very high input impedance which is very convenient in circuit design. The device is also simple in structure, and has high reproducibility and high frequency characteristics which allows high speed scanning. In this way, the circuit device according to the present invention has superior features in an industrial point of view.

We claim:

1. A semiconductor device for digital scanning including:

a plurality of voltage controlled type circuit elements of substantially identical electric characteristics disposed one after another, each having a first and a second electrode and a control electrode for voltage control of electric current flowing between the first and the second electrode;

first means for connecting the control electrode of each circuit element to that of a succeeding one through a resistive element;

second means, connected between the first and the second electrode of each circuit element, for supplying them with an electric current; and third means for applying electric pulses of a waveform, the height of which varies monotonically and non-linearly between a maximum and a minimum value with respect to time, between the control electrode of the first circuit element and that of the last, said maximum value being sufficiently great to permit the electric current to flow between the first and the second electrode of the last circuit element, the minimum value being sufficiently small to permit the electric current to flow between the first and the second electrode of only the first circuit element, so that the number of circuit elements in which the electric current flows between the first and the second electrode varies substantially linearly with time.

2. A semiconductor device in accordance with claim 1, wherein said voltage controlled type circuit element is a field effect transistor.

3. A semiconductor device in accordance with claim 2, wherein the field effect transistor is an enhancement type field effect transistor.

4. A semiconductor device in accordance with claim 2, wherein the resistors connected between the gate electrodes of the field effect transistors comprise a resistive substance layer which is formed by vacuum evaporation on an insulating layer existed between the gate electrodes.

5. A semiconductor device for digital scanning including:

a first and a second row consisting of a plurality of voltage controlled type circuit elements of substantially identical electric characteristics disposed one after another, each having a first and a second electrode, and a control electrode for voltage control of electric current flowing between the first and the second electrode, said two rows having the same number N of circuit elements;

first means for connecting the control electrode of each circuit element to that of a succeeding one through a resistive element;

second means for connecting the second electrode of the n-th circuit element of the first row with the first electrode of the $(N-n+1)$-th circuit element of the second row, $n$ being a positive integer not greater than N;

third means, connected between the first electrode of the n-th circuit element of the first row and the second electrode of the $(N-n+1)$-th circuit element of the second row, for supplying an electric current thereto.

fourth means for applying electroc pulses of a waveform, the height of which increases monotonically and non-linearly from a minimum to a maximum value with time, between the control electrode of the first circuit element and that of the last of the first row, said maximum value being sufficiently great to permit the electric current to flow between the first and the second electrode of the N-th circuit element, the minimum value being sufficiently small to permit the electric current to flow between the first and the second electrode of only the first circuit element of the first row, so that the number of circuit elements in which the electric current flows between the first and the second electrode increases substantially linearly with time; and fifth means for applying electric pulses of a waveform, the height of which decreases monotonically and non-linearly from a maximum to a minimum value with time, between the control electrode of the first circuit element and that of the last circuit element of the second row, said maximum value being sufficiently great to permit the electric current to flow between the first and the second electrode of the last circuit element, the minimum value being sufficiently small to permit the electric current to flow between the first and the second electrode of only the first circuit element of the second row, so that the number of circuit elements in which the electric current flows between the first and the second electrode decreases substantially linearly with time and so that a circuit element, through which the electric current flows, shifts from one end to the other of the rows with a substantially constant velocity.

6. A semiconductor device in accordance with claim 5, wherein the voltage controlled type circuit element is a field effect transistor.

7. A semiconductor device in accordance with claim 6, wherein the field effect transistor is an enhancement type field effect transistor.

8. A semiconductor device in accordance with claim 6, wherein the resistor connected between the gate electrodes of the field effect transistors comprises a resistive substance layer which is formed by vacuum evaporation on an insulating layer disposed between the gate electrodes.

9. A semiconductor scanning device comprising:

a plurality of discrete voltage sensitive switching elements, each having an input electrode, an output electrode and a control electrode, the application of a voltage to the control electrode of an element of a predetermined magnitude causing a conductive path to be provided between said input and output electrode, whereby a signal supplied to said input electrode may be provided at the output electrode;

means for resistively connecting the control electrodes of each of said elements together; and means for supplying a saw-tooth control voltage to the control electrodes of said plurality of elements, the magnitude of which varies non-linearly with time, whereby said elements will be switched ON to provide a conductive path between their respective input and output electrodes at different instances in time.

10. A semiconductor scanning device according to claim 9 wherein each of said voltage sensitive switching elements comprises a field effect transistor, the source and drain electrodes of which correspond to said input and output electrodes and the gate electrode of which corresponds to said control electrode.

11. A semiconductor scanning device according to claim 10, wherein said field effect transistors are formed on a common substrate into which the respective source and drain regions of said field effect transistors are formed and wherein the resistively connected gate electrodes are in the form of a longitudinal metallic resistive layer disposed on each gate insulator layer of each respective field effect transistor.

12. A semiconductor scanning device according to claim 11, wherein said metallic resistive layer is made from a material selected from the group consisting of tantalum, molybdenum, tungsten, chromium, titanium, and tin oxide.

13. A semiconductor scanning device according to claim 10, wherein each field effect transistor comprises an enhancement type field effect transistor.

14. A semiconductor scanning device according to claim 10, wherein each field effect transistor comprises a depletion type field effect transistor, and further including means for superimposing a D. C. bias voltage onto said control voltage supplying means.

15. A semiconductor scanning device according to claim 10, wherein said voltage sensitive switching elements are disposed in two parallel rows on a common substrate, into which the respective source and drain regions of said field effect transistors are formed and wherein a source and a drain of a respective field effect transistor adjacent each other in separate rows are connected together, and the resistive connection between the gate electrodes are in the form of a longitudinal metallic resistive layer disposed on each gate insulating layer of each respective field effect transistor in a parallel row.

16. A semiconductor device comprising:

a semiconductor substrate having a first conductivity type and having a main surface;

a row of a plurality of pairs of semiconductor regions of a second conductivity type opposite said first conductivity type disposed in the main surface of said substrate, each pair being spaced apart and each region of said pair being spaced with respect to each other;

a first layer of insulator material disposed over each of said pairs of regions and on said substrate except for predetermined portions of the regions of each pair of regions;

a plurality of pairs of electrodes extending through said first layer of insulator material and contacting said respective regions of said pairs of regions;

an electrode layer disposed on the portion of said first insulator layer between said respective regions of each pair ; and a resistive layer disposed on said electrode layer between said regions and extending continuously to overlie each portion of said substrate disposed between the regions of each pair of regions.

17. A semiconductor device according to claim 16, wherein the thickness of said resistive layer varies along the length thereof.

18. A semiconductor device according to claim 16, wherein the width of said resistive layer varies along the length thereof.

19. A semiconductor device according to claim 16, further including means for applying a saw-tooth wave form the magnitude of which varies non-linearly with respect to time to said resistive layer.

20. A semiconductor device according to claim 16, wherein the distance between each adjacent pair of said semiconductor regions decreases from one end of said row to the other end thereof.

20. A semiconductor device according to claim 16, wherein the distance between each adjacent pair of said semiconductor regions decreases from one endo said row to the other end thereof.

* * * * *